Figure 1:
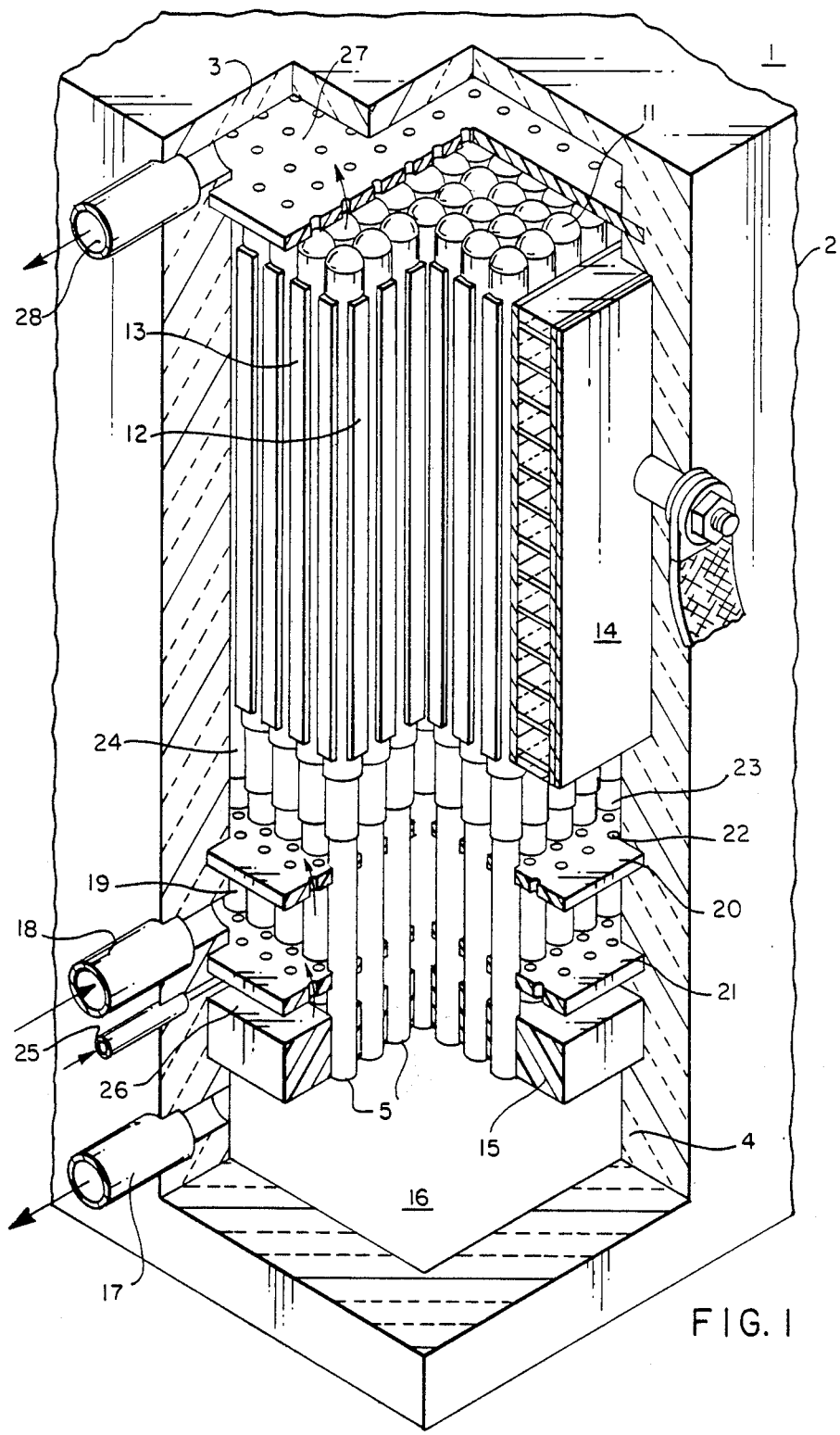

United States Patent [19]

Draper et al.

[11] Patent Number: 4,801,369
[45] Date of Patent: Jan. 31, 1989

[54] PREVENTING FLUIDS IN LEAKABLE ENCLOSURES FROM INTERMIXING

[75] Inventors: Robert Draper, Churchill Boro; Stephen E. Veyo, Murrysville, both of Pa.

[73] Assignee: Westinghouse Electric Corp., Pittsburgh, Pa.

[21] Appl. No.: 67,576

[22] Filed: Jun. 29, 1987

[51] Int. Cl.[4] .................. C25B 9/00; C25B 13/02; E03B 1/00; F16K 23/00
[52] U.S. Cl. .................... 204/258; 204/260; 204/265; 204/266; 204/277; 204/278; 204/279; 137/1; 137/312
[58] Field of Search ............... 137/208, 312, 1; 204/277–278, 275, 279, 265, 266, 256, 258, 260

[56] References Cited

U.S. PATENT DOCUMENTS

| | | | |
|---|---|---|---|
| 1,991,838 | 2/1935 | Billiter | 204/277 X |
| 2,328,484 | 8/1943 | Oosterhuis | 204/277 X |
| 2,373,032 | 4/1945 | Klein | 204/278 |
| 2,424,440 | 8/1947 | Duffy | 137/208 |
| 2,744,061 | 5/1956 | DeFord et al. | 204/275 X |
| 3,220,937 | 11/1965 | Friese et al. | 204/277 X |
| 3,554,892 | 1/1971 | Schellens et al. | 204/224 M |
| 3,720,595 | 3/1973 | Kohler | 204/275 X |
| 4,308,125 | 12/1981 | Kaczur et al. | 204/279 |

Primary Examiner—Donald R. Valentine
Attorney, Agent, or Firm—Joyce L. Morrison

[57] ABSTRACT

Disclosed is an apparatus which comprises a first enclosure for containing a first fluid, a second enclosure for containing a second fluid, a pathway between the first and second enclosures through which the first fluid can leak from the first enclosure into the second enclosure, and means for admitting into said pathway a third fluid under greater pressure than either the first fluid or the second fluid, whereby the third fluid leaks into the first and second enclosures and prevents the first and second fluids from intermixing. In particular, the apparatus is a solid oxide water electrolyzer having a multiplicity of electrically interconnected vertical tubes sealed at one end where each tube comprises a solid oxide oxygen ion conducting electrolyte sandwiched between an oxygen permeable anode on the inside of the tube and an oxygen permeable cathode on the outside of the tube, a first plenum leakably sealed to the outside of the tubes into which steam can be admitted, a second plenum leakably sealed to the outside of the tubes in gaseous communication with the inside of the tubes from which oxygen can be taken, and a third plenum inbetween the first plenum and the second plenum into which pressurized steam can be admitted.

7 Claims, 2 Drawing Sheets

PREVENTING FLUIDS IN LEAKABLE ENCLOSURES FROM INTERMIXING

BACKGROUND OF THE INVENTION

An electrolyzer is an apparatus for electrically dissociating water into hydrogen and oxygen. Electrolyzers are advantageous over other methods of dissociating water because they use low voltage electricity and produce no noise and very little pollution. In a solid oxide water electrolyzer, steam is admitted to one side of an oxygen ion conducting barrier that is sandwiched between two electrodes. Passing electricity between the electrodes causes the steam to dissociate into hydrogen and oxygen. The oxygen is transported through the barrier as oxygen ions and is collected on the other side of the barrier. In order to prevent the subsequent recombination of the oxygen and the hydrogen by intermixing of the oxygen and the hydrogen that are on opposite sides of the barrier, which could result in fire or explosion, it is necessary to seal one side of the barrier from the other. However, because solid oxide electrolyzers utilize ceramic materials and operate at very high temperatures, it has been very difficult to design seals that would not leak. Seals can be formed using a high temperature adhesive such as ceramic frit. However, cracks in the seals can occur during temperature cycling due to differences in the coefficients of thermal expansion of the sealants and the materials they seal. It is especially difficult to design positive mechanical seals when the temperature of the electrolyzer is very high, and yet it is at these very high temperatures that the electrolyzer is most efficient in dissociating water into hydrogen and oxygen. It has been calculated, for example, that the electrical energy required to operate the electrolyzer at 1000° C. is only 79% of that required at 100° C. Thus, until this problem of seals in solid state electrolyzers is overcome, the electrolyzers will not be most efficiently utilized. Inefficient electrolyzers may even be so uneconomical for many applications that they will not be used at all.

SUMMARY OF THE INVENTION

We have discovered an unusual solution to the problem of sealing separated fluids that might otherwise intermingle by leaking from their enclosures. Instead of trying to prevent such leaks by developing better seals, as others have done, we have instead found another way of preventing the fluids from leaking through the seals. We introduce a third fluid that is in an enclosure inbetween the enclosures holding the fluids that one wishes to separate. The third fluid is under greater pressure than the other two fluids and therefore leaks through the seals into the enclosures holding the other two fluids. Of course, the third fluid is selected so that its intermixing with the other fluids does not create the difficulties that would arise if the other two fluids themselves intermixed.

In this way, we are able to avoid the necessity of forming positive mechanical seals. Since positive mechanical seals are not used, there is no need to operate the electrolyzer at inefficient lower temperatures in order to avoid cracking the seals. As a result, we are able to operate the electrolyzer at higher temperatures, saving electricity and producing hydrogen and oxygen at a lower cost.

DESCRIPTION OF THE INVENTION

The accompanying drawing is an isometric view partially in section illustrating a certain presently preferred embodiment of a solid oxide water electrolyzer according to this invention.

Figure 2:
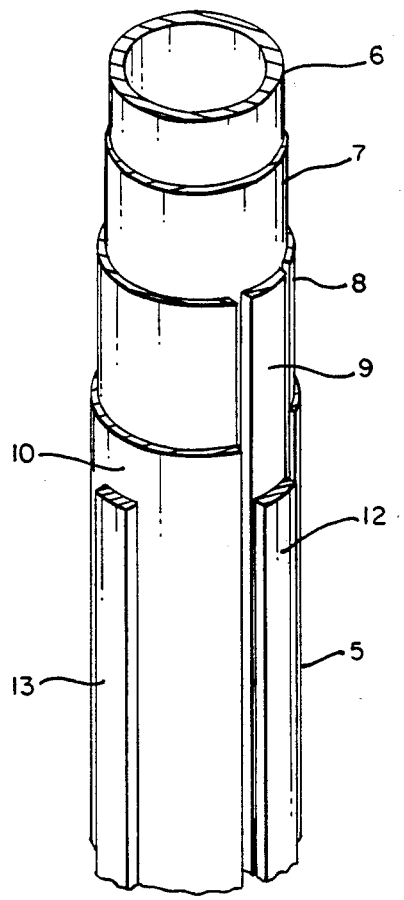

FIG. 2 is an isometric view partially in section illustrating a certain presently preferred embodiment of the solid oxide electrolyzer tube shown in FIG. 1.

In FIG. 1, electrolyzer 1 consists of a container 2 formed of high temperature insulating material 3 which encloses space 4 in which are placed a multiplicity of electrically interconnected solid oxide electrolyzer tubes 5.

Referring now to FIG. 2, each tube 5 is formed of a ceramic support tube 6 and an oxygen permeable oxygen electrode 7. An oxygen ion conducting electrolyte 8 forms the second coating on the support tube 5 and covers oxygen electrode 7 over an azymuthal angle of about 295°. The remaining 65° is covered by electrically conducting interconnection strip 9. Water vapor-hydrogen electrode 10 forms the outer coating and covers the electrolyte 8 over an azymuthal angle of 280°. The remaining 80° is uncoated in order to expose interconnection strip 9. Support tube 6 extends beyond the other coatings of the tube at the base of the tubes. Each tube 5 is sealed at the top with ceramic cap 11 and is open at the bottom. Solid oxide tubes are normally made of high temperature ceramic materials that are either oxygen ion conducting or are permeable to oxygen, such as alumina, zirconia, or mullite. The construction of cells 5 is identical to the construction of fuel cell tubes for use in solid oxide fuel cells, and various publications, such as U.S. Pat. Nos. 4,395,468 and 4,374,184, herein incorporated by reference, can be referred to for additional details.

Referring again to FIG. 1, the cylindrical tubes 5 are placed in a square pitch rectangular array where the rows are electrically connected in series and the columns are connected in parallel. When the cells are connected in series the oxygen electrode 7 of one cell is connected to the water vapor electrode 10 of another cell by means of interconnection 9 and nickel felt strips 12. Other nickel felt strips 13 provide parallel connections between the water vapor-hydrogen electrodes 10 of adjacent cells. An anode 14 is electrically connected to nickel felt strips 12 and a cathode (not shown) on the opposite side of the electrolyzer is electrically connected to water vapor-hydrogen electrodes 10.

The array of cells is supported by a dense ceramic tube sheet 15 at its lower extremity. The joint between the support tube 6 of tubes 5 and tube sheet 15 is not a fused or tight bond but is packed with ceramic wool. The plenum formed below tube sheet 15 connects to the inside of the tubes and forms the oxygen discharge chamber 16. Oxygen in chamber 16 leaves by means of discharge header 17. Steam feed stock, containing a few percent of recirculated hydrogen in order to provide a reducing atmosphere over water vapor-hydrogen electrode 10, flows from feed header 18 into distribution chamber 19, which is formed by ceramic distribution plate 20 and a second distribution plate 21. Distribution plate 20 contains perforations 22, in addition to apertures 23, through which tubes 5 pass, in order to facilitate the flow of the feed into reaction space 24.

Pure steam flows from a feed header 25 into distribution chamber 26 which is formed between tube sheet 15 and lower distribution plate 21. Clearance between holes in the lower distribution plate 21 and the support tubes 6 of tubes 5 permits the controlled leakage of the steam from the pure steam chamber 26 into the feed distribution chamber 19 since the pure steam is under greater pressure than is the feed steam. The steam in distribution chamber 26 also flows through the clearance between the tubes in distribution plate 15 and mixes with oxygen in oxygen discharge chamber 16 because the steam in distribution chamber 26 is under greater pressure than is the oxygen in oxygen discharge chamber 16.

When the DC power is applied to the anode and the cathode, oxygen from the dissociated steam migrates as oxygen ions through electrolyte 8 of the tubes into the inside of the tubes, passing down into oxygen discharge chamber 16 and out through discharge header 17. The hydrogen that is formed remains on the outside of tubes 5 and passes upward through take off distribution plate 27 and out through exhaust header 28.

A typical electrolyzer might operate at about 0.5 to about 0.7 volts per cell at a temperature of about 800° to about 1100° C. Electrolyzer dimensions are not critical; a typical tube might be 50 cm to 100 cm long.

In addition to its application to electrolyzers, this invention can be applied to any type of apparatus where it is necessary to prevent two fluids from leaking from their enclosures and intermixing. The particular third fluid that is used to prevent the separated fluids from leaking out of their enclosures will depend upon the particular fluids involved. Obviously, the third fluid will be selected so that it does not contaminate the other fluids, is not identical to one of the other fluids, and preferably is easily separated from the other fluids. The other fluids may be either gases or liquids.

We claim:

1. Apparatus comprising:
(A) a first enclosure for containing a first fluid;
(B) a second enclosure for containing a second fluid;
(C) a pathway between said first and second enclosures through which said first fluid can leak from said first enclosure into said second enclosure; and
(D) means for admitting into said pathway a third fluid under greater pressure than either said first fluid or said second fluid;
(E) a first fluid in said first enclosure, a second fluid in said second enclosure, and a third fluid in said pathway;
said first, second, and third fluids are gases; and electrolyzer means for dissociating steam into hydrogen and oxygen.

2. A water electrolyzer comprising:
(A) an oxygen ion conducting barrier, whereby steam on one side of said barrier is dissociated into oxygen and hydrogen, and said oxygen is transported to the opposite side of said barrier;
(B) hydrogen collecting means leakably sealed to said one side of said barrier;
(C) oxygen collecting means leakably sealed to the opposite side of said barrier; and
(D) means for providing steam inbetween said hydrogen collecting means and said oxygen collecting means, at a pressure sufficient to force said steam to leak into said hydrogen and oxygen collecting means.

3. An electrolyzer according to claim 2 wherein said barrier is a tube sealed at one end.

4. A solid oxide water electrolyzer comprising:
(A) a multiplicity of electrically interconnected vertical tubes sealed at one end, comprising a solid oxide oxygen ion conducting electrolyte sandwiched between an oxygen permeable anode on the inside of said tube and an oxygen permeable cathode on the outside of said tube;
(B) a first plenum leakably sealed to the outside of said tubes into which steam can be admitted;
(C) a second plenum leakably sealed to the outside of said tubes in gaseous communication with the inside of said tubes, from which oxygen can be taken; and
(D) a third plenum inbetween said first plenum and said second plenum into which pressurized steam can be admitted.

5. An electrolyzer according to claim 4 wherein the open ends of said vertical tubes are at the bottom of said tubes.

6. An electrolyzer according to claim 4 wherein said first plenum is formed by a container surrounding said tubes and by a first horizontal plate extending from said container to said tubes, said first horizontal plate having a multiplicity of apertures therethrough through which said tubes pass in leakably sealed relationship thereto, and said second and third plenums are formed by a second horizontal plate extending from said container to said tubes, said second plate having a multiplicity of apertures therethrough into which said tubes extend in leakably sealed relationship therewith.

7. A method of preventing two fluids from intermixing, where one fluid is in a first enclosure and the other fluid is in a second enclosure, and one fluid can leak from its enclosure into the other enclosure, comprising forming a third enclosure in between said first enclosure and said second enclosure and placing a third fluid in said third enclosure under a pressure sufficient to cause said third fluid to leak from said third enclosure into said first and second enclosures, whereby said first, second and third fluids are gases and the third fluid is steam.

* * * * *